United States Patent
Lee et al.

(10) Patent No.: US 10,333,738 B2
(45) Date of Patent: Jun. 25, 2019

(54) METHOD AND APPARATUS FOR RECEIVING DATA AND METHOD FOR TRANSMITTING DATA IN MOBILE COMMUNICATION SYSTEM

(71) Applicant: ELECTRONICS AND TELECOMMUNICATIONS RESEARCH INSTITUTE, Daejeon (KR)

(72) Inventors: Yu Ro Lee, Daejeon (KR); Kwang Jae Lim, Daejeon (KR); Won-Ik Kim, Daejeon (KR); Taegyun Noh, Daejeon (KR); Sung Cheol Chang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 444 days.

(21) Appl. No.: 15/173,624

(22) Filed: Jun. 4, 2016

(65) Prior Publication Data

US 2016/0360529 A1 Dec. 8, 2016

(30) Foreign Application Priority Data

Jun. 4, 2015 (KR) .................. 10-2015-0079425
Jun. 3, 2016 (KR) .................. 10-2016-0069416

(51) Int. Cl.
*H04L 5/00* (2006.01)
*H04W 56/00* (2009.01)
(Continued)

(52) U.S. Cl.
CPC .......... *H04L 25/0224* (2013.01); *H04L 5/006* (2013.01); *H04L 5/0048* (2013.01);
(Continued)

(58) Field of Classification Search
None
See application file for complete search history.

(56) References Cited

U.S. PATENT DOCUMENTS

2009/0175372 A1 7/2009 Moon et al.
2010/0260164 A1* 10/2010 Moon ............... H04L 5/0007
370/345

(Continued)

FOREIGN PATENT DOCUMENTS

JP 2000-020416 A 1/2000
KR 10-2009-0067011 A 6/2009
KR 10-2014-0132336 A 11/2014

OTHER PUBLICATIONS

"3rd Generation Partnership Project" etc., 3GPP TS 36.211 V12.5.0, Mar. 2015.

*Primary Examiner* — Ajit Patel
(74) *Attorney, Agent, or Firm* — Rabin & Berdo, P.C.

(57) ABSTRACT

A base station defines a short TTI (transmission time interval) equal to the length of one subslot as the minimum unit of a time resource for data transmission in a subframe including a plurality of subslots, determines the RS type the terminal will use for transmission, among a plurality of RS types, based on the positions of RSs (reference signals) within the short TTI, and sends information on the RS type the terminal will use for transmission to the terminal.

20 Claims, 14 Drawing Sheets

(51) Int. Cl.
*H04L 25/02* (2006.01)
*H04L 27/26* (2006.01)

(52) U.S. Cl.
CPC .......... *H04L 5/0085* (2013.01); *H04L 5/0091* (2013.01); *H04L 25/0212* (2013.01); *H04L 25/0226* (2013.01); *H04W 56/002* (2013.01); *H04L 27/2611* (2013.01)

(56) References Cited

U.S. PATENT DOCUMENTS

| | | | |
|---|---|---|---|
| 2011/0142076 A1* | 6/2011 | Ko | H04L 1/0625 370/480 |
| 2012/0002568 A1* | 1/2012 | Tiirola | H04L 1/0026 370/252 |
| 2013/0070698 A1 | 3/2013 | Kim et al. | |
| 2014/0126505 A1* | 5/2014 | Chun | H04L 5/0053 370/329 |
| 2014/0241273 A1* | 8/2014 | Kim | H04J 11/005 370/329 |
| 2014/0376465 A1 | 12/2014 | Choi et al. | |
| 2015/0003356 A1 | 1/2015 | Seo et al. | |
| 2015/0295733 A1* | 10/2015 | Annavajjala | H04L 25/0206 375/260 |
| 2015/0304014 A1* | 10/2015 | Sadeghi | H04J 13/004 370/315 |
| 2016/0087709 A1* | 3/2016 | Horiuchi | H04B 7/068 375/260 |
| 2016/0127093 A1* | 5/2016 | Jiang | H04L 5/0051 370/330 |
| 2017/0331547 A1* | 11/2017 | Kim | H04B 7/26 |

* cited by examiner

METHOD AND APPARATUS FOR RECEIVING DATA AND METHOD FOR TRANSMITTING DATA IN MOBILE COMMUNICATION SYSTEM

CROSS-REFERENCE TO RELATED APPLICATION

This application claims priority to and the benefit of Korean Patent Application Nos. 10-2015-0079425, and 10-2016-0069416 filed in the Korean Intellectual Property Office on Jun. 4, 2015, and Jun. 3, 2016, the entire contents of which are incorporated herein by reference.

BACKGROUND OF THE INVENTION (a) Field of the Invention

The present invention relates to a method and apparatus for receiving data and method for transmitting data in a mobile communication system, and more particularly, to an apparatus and method for receiving data and method for transmitting data which can improve transmission efficiency.

(b) Description of the Related Art

In an LTE (Long Term Evolution) system, one frame consists of 10 subframes, each subframe consists of two slots, and each slot consists of 6 or 7 symbols depending on the length of a CP (cyclic prefix). TTI (Transmission Time Interval), a data transmission unit, is 1 ms, which is equal to the length of a subframe.

In the frequency domain, an uplink subframe, which is used in the LTE system, is divided into a control region where PUCCH (Physical Uplink Control Channel) is allocated and a data region where PUSCH (Physical Uplink Shared Channel) is allocated. In the uplink, reference signals (RS) are not precoded as opposed to data, and include DMRSs (Demodulation RS) and SRSs (Sounding RS). The DMRSs are reference signals used to obtain channel information for uplink data demodulation, and the SRSs are reference signals used to measure the uplink channel.

In order for 5th generation communication systems to provide more diverse services than 4th generation communication systems, a low-delay technology is required which enables data exchange between a base station and a terminal within a short time.

In LTE systems, the time required for transmission in a wireless zone is as much as 1 ms, thus, it is necessary to reduce the length of the TTI for low-delay purposes. Also, as far as HARQ (Hybrid Automatic Repeat Request) is concerned, it is necessary to reduce the demodulation time after the base station or terminal receives a signal. For example, suppose that the TTI has a length of x ms and a HARQ re-transmission is made after three TTIs, the allowable maximum demodulation delay is 3x. A reduction in the TTI length increases the DMRS overhead (ratio between the number of data subcarriers and the number of DMRS subcarriers) for maintaining the same channel estimation performance, and a reduction in DMRS overhead may deteriorate the channel estimation performance. For example, in the case of the TTI consists of two symbols, a DMRS corresponding to one symbol is required to achieve the same channel estimation performance as the TTI is 1 ms and intra frame hopping is applied. In this instance, the DMRS overhead increases from 14%, which is obtained for a TTI of 1 ms, to 50%. Moreover, the requirements for reduction of demodulation delay set limits on the positions of PUSCH and PUCCH in resource elements including subcarriers and symbols, which may result in performance deterioration.

For example, in a case where the TTI consists of two symbols and a DMRS is allocated at the first symbol in order to reduce the demodulation delay, channel estimation can be done as long as the first symbol is received, and the time required for channel estimation can be reduced. Thus, the demodulation delay can be reduced. However, there is a difference in the number of data subcarriers used between the first symbol and the second symbol. This disables symbol hopping, and therefore causes performance deterioration. In addition, in the case of systems for which low-delay is an important issue, SC-FDMA (Single-carrier Frequency Division Multiple Access) adapted in LTE systems can improve PAPR (peak-to-average power ratio) but causes demodulation delay.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for receiving data and method for transmitting data in a mobile communication system which offer the advantage of reducing DMRS overhead and demodulation delay.

An exemplary embodiment of the present invention provides a method for a base station to receive data from a terminal. The data receiving method includes: defining a short TTI (transmission time interval) equal to the length of one subslot as the minimum unit of a time resource for data transmission in a subframe including a plurality of subslots; determining the RS type the terminal will use for transmission, among a plurality of RS types, based on the positions of RSs (reference signals) within the short TTI; and sending information on the RS type the terminal will use for transmission to the terminal.

The determining may include determining the RS type the terminal will use for transmission by taking into account at least one among the channel status between the terminal and the base station, the demodulation delay time, the moving speed of the terminal, the RS types transmittable by the terminal, and the RS types that can be demodulated by the base station.

The data receiving method may further include: receiving SRSs (sounding RSs) from the terminal; and estimating the channel status between the base station and the terminal based on the SRSs.

The determining may further include receiving information on the RS type transmittable by the terminal from the terminal.

The data receiving method may further include: determining a transmitting block structure for use in the terminal and a receiving block structure for use in the base station, corresponding to the transmitting block structure; and sending information on the transmitting block structure for use in the terminal to the terminal.

The data receiving method may further include: configuring transmitting blocks according to the transmitting block structure and processing data according to the functions of the configured transmitting blocks; and mapping RSs and the processed data to resource elements depending on the RS type the terminal will use for transmission and sending the mapped RSs and data.

The determining of the transmitting block structure and the receiving block structure may include determining the transmitting block structure and the receiving block structure by taking into account at least one among the channel status between the base station and the terminal, the transmitting block structures configurable by the terminal, the data requirements, the moving speed of the terminal, and the receiving block structures configurable by the base station.

The transmitting block structure information may include information on the transmitting blocks whose functions are to be turned off, among the transmitting blocks configurable by the terminal.

The data receiving method may further include updating the transmitting block structure for use in the terminal and the receiving block structure for use in the base station, corresponding to the transmitting block structure, based on at least one between a request from the terminal and the data requirements.

The data receiving method may further include updating the RS type the terminal will use for transmission based on the channel status between the base station and the terminal.

The RSs may include DMRSs (Demodulation RSs).

Another exemplary embodiment of the present invention provides a method for a terminal to transmit data. The data transmitting method may include: sending information on the RS type transmittable by the terminal, among a plurality of RS types, based on the positions of RSs (reference signals) within a short TTI, the minimum unit of a time resource for data transmission in a subframe including a plurality of subslots, which is equal to the length of one subslot; receiving information on the RS type the terminal will use for transmission from the base station; and mapping RSs and data to resource elements based on the RS type information.

The data transmitting method may further include: sending information on transmitting blocks configurable by the terminal; receiving information on transmitting blocks the terminal will use from the base station; and processing the data according to the functions of transmitting blocks configured based on the information on transmitting blocks the terminal will use.

The transmitting blocks the terminal will use may be determined by taking into account at least one among the channel status between the base station and the terminal, the transmitting block structures configurable by the terminal, the data requirements, the moving speed of the terminal, and the receiving block structures configurable by the base station.

The RS type the terminal will use for transmission may be determined by the base station by taking into account at least one among the channel status, the demodulation delay time, the moving speed of the terminal, the RS types transmittable by the terminal, and the RS types that can be demodulated by the base station.

The RSs may include DMRSs (Demodulation RSs).

Another exemplary embodiment provides an apparatus for a base station to receive data from a terminal. The data receiving apparatus includes a processor and a transceiver. The processor defines a short TTI (transmission time interval) equal to the length of one subslot as the minimum unit of a time resource for data transmission in a subframe including a plurality of subslots, determines the DMRS type the terminal will use for transmission, among a plurality of DMRS types, based on the positions of DMRSs (demodulation reference signals) within the short TTI, and determines the transmitting block structure the terminal will use. The transceiver sends information on the DMRS type the terminal will use for transmission and information on the transmitting block structure the terminal will use to the terminal.

The processor may determine the DMRS type the terminal will use for transmission by taking into account at least one among the channel status between the base station and the terminal, the demodulation delay time, the moving speed of the terminal, the DMRS types transmittable by the terminal, and the DMRS types that can be demodulated by the base station.

The processor may determine the transmitting block structure the terminal will use by taking into account at least one among the channel status between the base station and the terminal, the transmitting block structures configurable by the terminal, the data requirements, the moving speed of the terminal, and the receiving block structures configurable by the base station.

The transmitting block structure information may include information on the transmitting blocks whose functions are to be turned off, among the transmitting blocks configurable by the terminal.

According to an exemplary embodiment of the present invention, the DMRS overhead and the demodulation delay may be reduced by determining the DMRS type and the transmitting block functions, taking into account the channel environment, the constraints on the delay time, etc. into account.

DETAILED DESCRIPTION OF THE EMBODIMENTS

Figure 1:
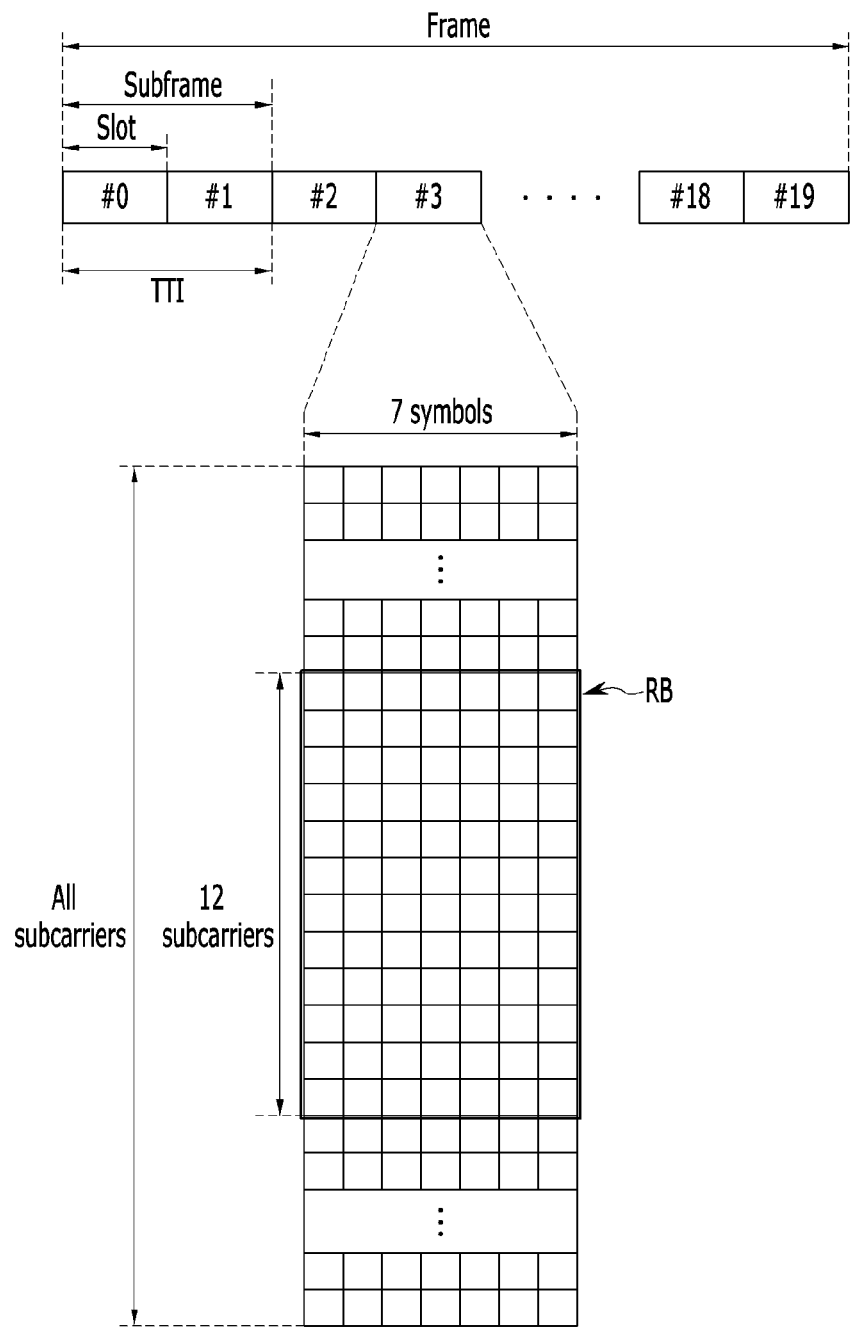
FIG. 1 is a view showing uplink subframes in a mobile communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include all or some of the functions of the MT, MS, AMS, HR-MS, SS, PSS, AT, and UE.

Also, a base station (BS) may refer to an advanced base station (ABS), a high reliability base station (HR-BS), a nodeB, an evolved node B (eNodeB), an access point (AP), a radio access station (RAS), a base transceiver station (BTS), a MMR (mobile multihop relay)-BS, a relay station (RS) serving as a base station, a relay station (RS) serving as a base station, a relay node (RN) serving as a base station, an advanced relay station (ARS) serving as a base station, a high reliability relay station (HR-RS) serving as a base station, and a small base station [femto base station (femto BS), a home nodeB (HNB), an eNodeB (HeNB), a pico base station (pico BS), a metro base station (metro BS), a micro base station (micro BS, etc.], and may include all or some of the functions of the ABS, nodeB, eNodeB, AP, RAS, BTS, MMR-BS, RS, RN, ARS, HR-RS, and small base station.

Now, a method and apparatus for receiving data and method for transmitting data in a mobile communication system according to an exemplary embodiment of the present invention will be described in detail with reference to the drawings.

FIG. 1 is a view showing uplink subframes in a mobile communication system.

Referring to FIG. 1, in an LTE (Long Term Evolution) system, which is a typical mobile communication system, one frame has a length of 10 ms in the time domain, and comprises 20 slots #0-#19, each with a length of 0.5 ms. One subframe has a length of 1 ms, and consists of two slots. Each slot comprises a plurality of symbols in the time domain, and comprises a plurality of subcarriers in the frequency domain. The symbols may be called OFDM (Orthogonal Frequency Division Multiplex) symbols, OFDMA symbols, SC-FDMA Single Carrier-Frequency Division Multiple Access) symbols, etc. depending on the multiple access method. The number of symbols per slot may vary depending on the channel bandwidth or the CP (cyclic prefix) length. For example, in the case of a normal CP, one slot comprises 7 symbols, and in the case of an extended CP, one slot comprises 6 symbols.

In the case of a FDD (frequency division duplex) frame for which uplink and downlink are separated in the frequency domain, a downlink subframe may be split into a control region and a data region in the time domain. For the control region, PDCCH (Physical Downlink Control Channel), PCFICH (Physical Control Format Indicator Channel), PHICH (Physical Hybrid automatic retransmit request Indicator Channel), etc. may be allocated. The data region comprises PDSCH (physical downlink shared channel) for transmitting downlink data. An uplink subframe may be split into a control region and a data region in the frequency domain. For the control region, PUCCH (Physical Uplink Control Channel) for transmitting uplink control information (UCI) is allocated. For the data region, PUSCH (Physical Uplink Shared Channel) for transmitting uplink data is allocated. DMRSs for demodulating an uplink signal are allocated for the control and data regions, and some symbols in the data region are used to send SRSs. The SRSs may be allocated for the last symbol of the subframe.

In LTE systems, a TTI is defined as the minimum unit of a time resource for data transmission, and is set equal to the length of one subframe. That is, the TTI has a length of 1 ms. A resource block (RB), the basic unit for data transmission in the physical layer consists of a plurality of symbols and a plurality of subcarriers. For example, in the case of a normal CP, one RB may consist of 12 subcarriers and 7 symbols.

However, the TTI having a length of 1 ms used in LTE systems is not appropriate for low-delay service for which an end-to-end transmission delay of 1 ms or below is required.

Figure 2:
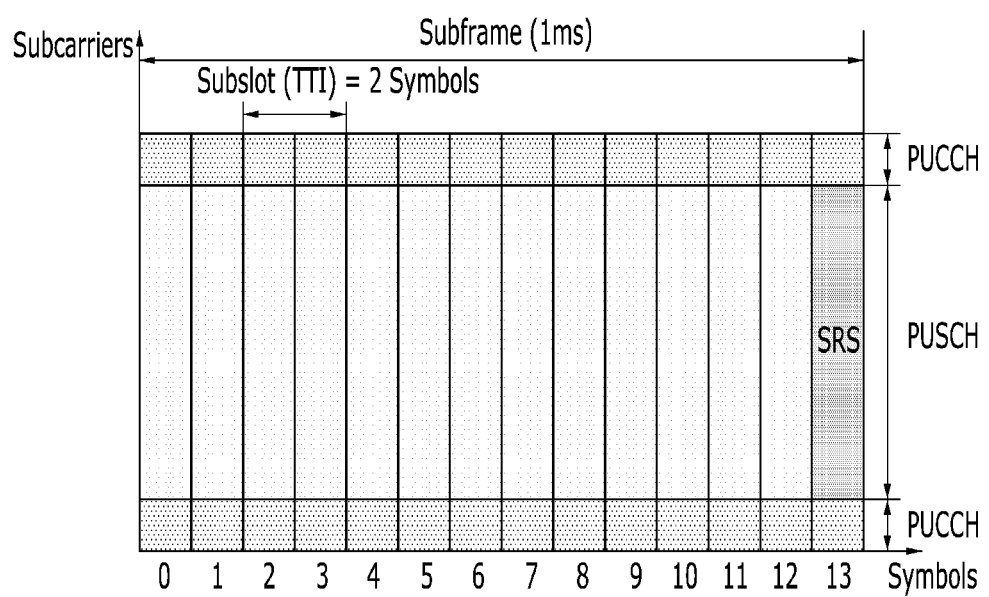
FIG. 2 is a view showing an example of a frame structure having short TTIs according to an exemplary embodiment of the present invention.

FIG. 2 is a view showing an example of a frame structure having short TTIs according to an exemplary embodiment of the present invention.

Referring to FIG. 2, one subframe may consist of a plurality of subslots. Each subslot may comprise two symbols.

In such a subframe consisting of a plurality of subslots, the TTI is set equal to the length of one subslot. That is, the TTI is set equal to the length of two symbols, and has a time length of about 1/7 the existing TTI's length of 1 ms. The TTI set equal to the length of one subslot is hereinafter referred to as a short TTI so as to distinguish it from the existing TTI of a conventional LTE system.

Although the following description will be made with respect to a subslot consisting of two symbols for convenience, the number of symbols in each subslot may vary as long as the length of one subslot is no longer than 1 ms. For example, one subslot may comprise three symbols.

Such an uplink subframe having short TTIs may be split into a control region and a data region in the frequency domain, as is in the conventional art. Also, some symbols of the uplink subframe may be used for SRS transmission.

FIG. 3 to FIG. 7 are views showing the positions of DMRSs according to an exemplary embodiment of the present invention.

Figure 3:
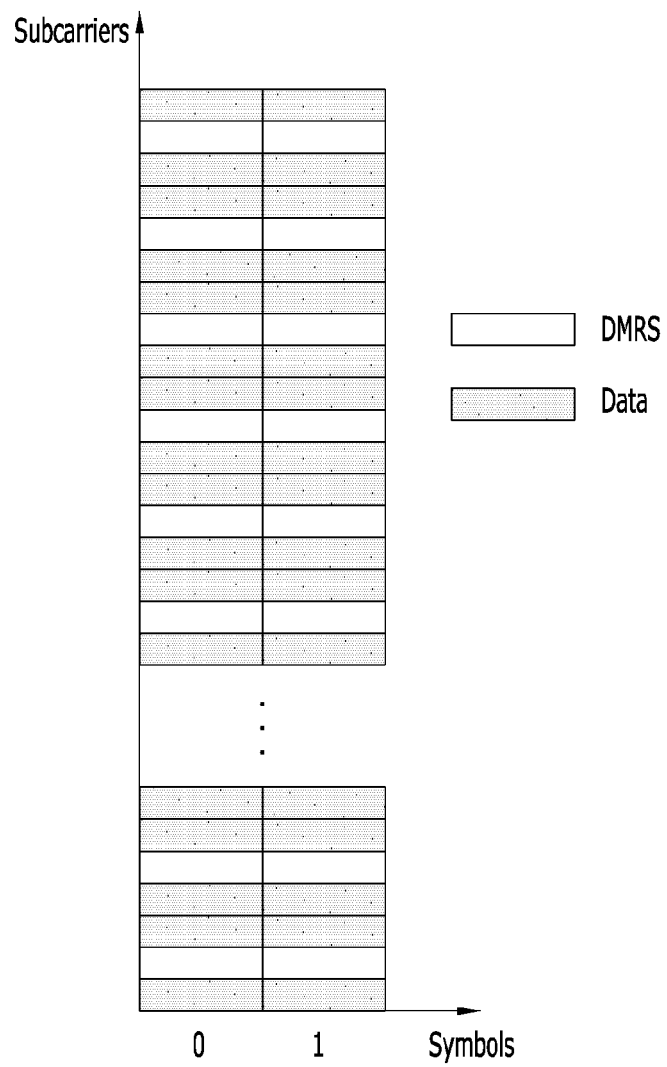
FIG. 3 to FIG. 7 are views showing the positions of DMRSs according to an exemplary embodiment of the present invention.
Figure 4:
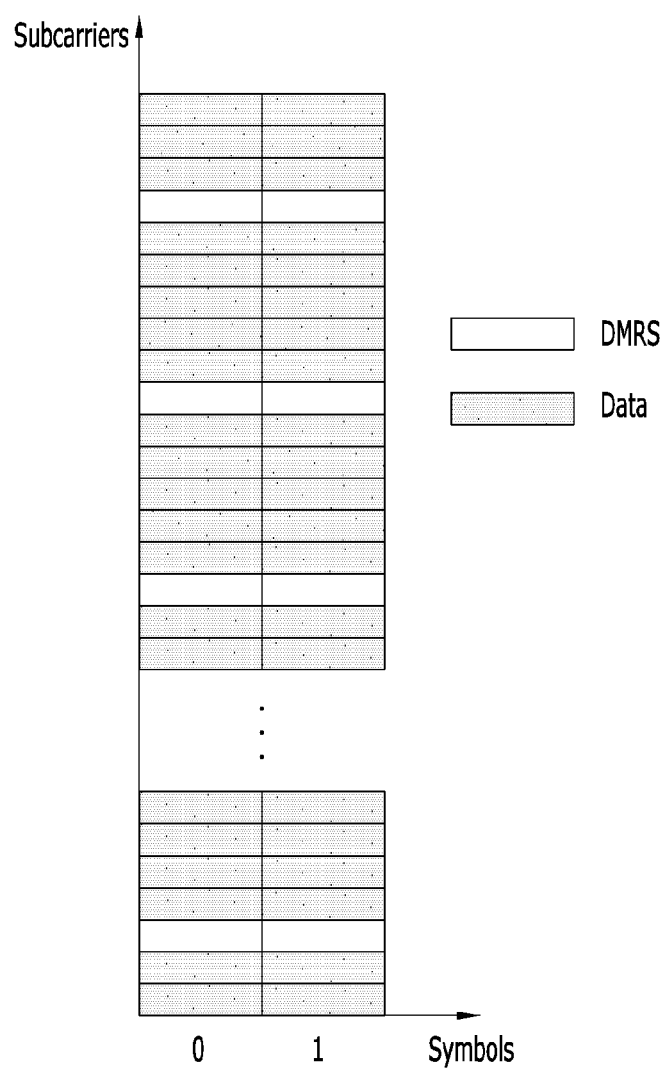

Referring to FIG. 3 and FIG. 4, DMRSs may be allocated at fixed subcarrier spacing in the first symbol (0) and the second symbol (1). As shown in FIG. 3, DMRSs of DMRS type 1 may be allocated at the spacing of 3 subcarriers in the first and second symbols (0) and (1), and as shown in FIG. 4, DMRSs of DMRS type 2 may be allocated at the spacing of 6 subcarriers in the first and second symbols (0) and (1).

Figure 5:
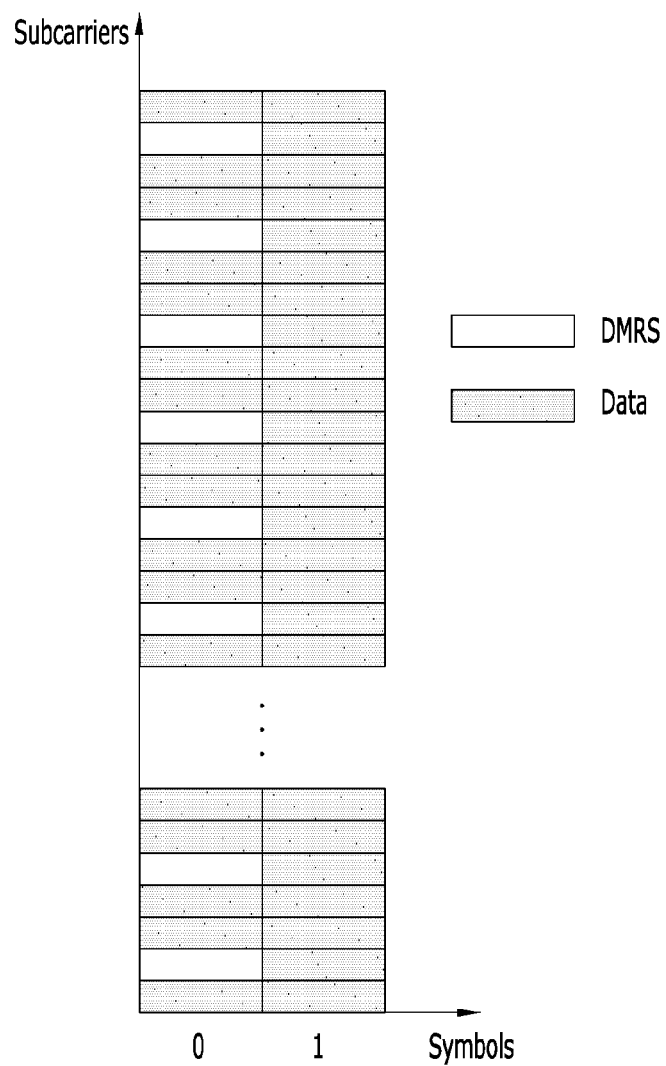
Figure 6:
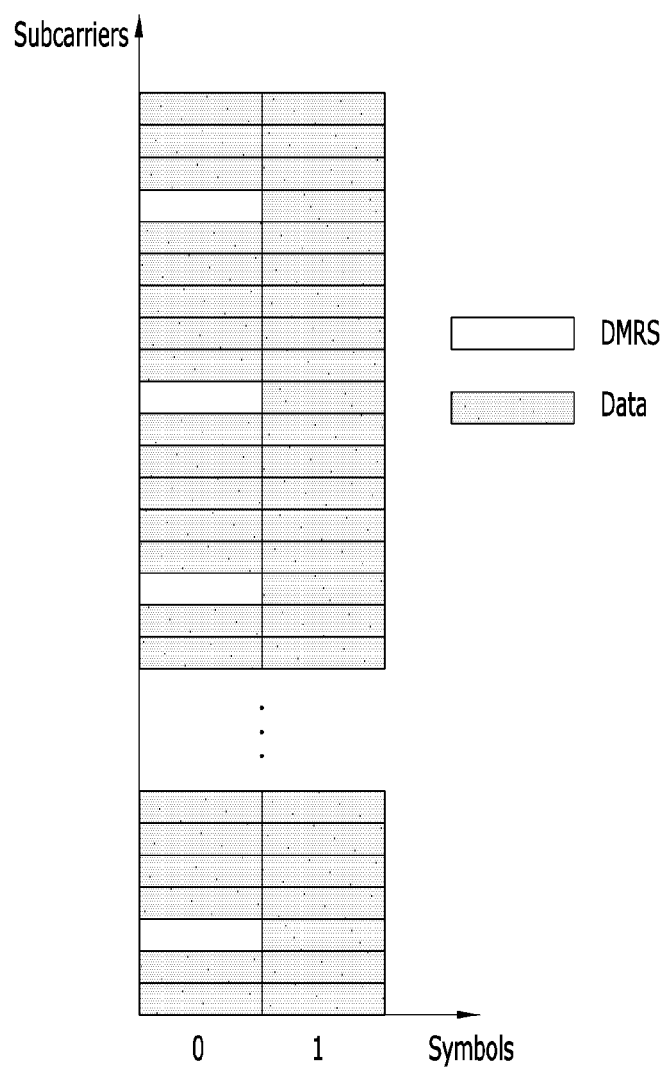

Referring to FIG. 5 and FIG. 6, DMRSs may be allocated at fixed subcarrier spacing in the first symbol (0). As shown in FIG. 5, DMRSs of DMRS type 3 may be allocated at the spacing of 3 subcarriers in the first symbol (0), and as shown in FIG. 6, DMRSs of DMRS type 4 may be allocated at the spacing of 6 subcarriers in the first symbol (0).

Figure 7:
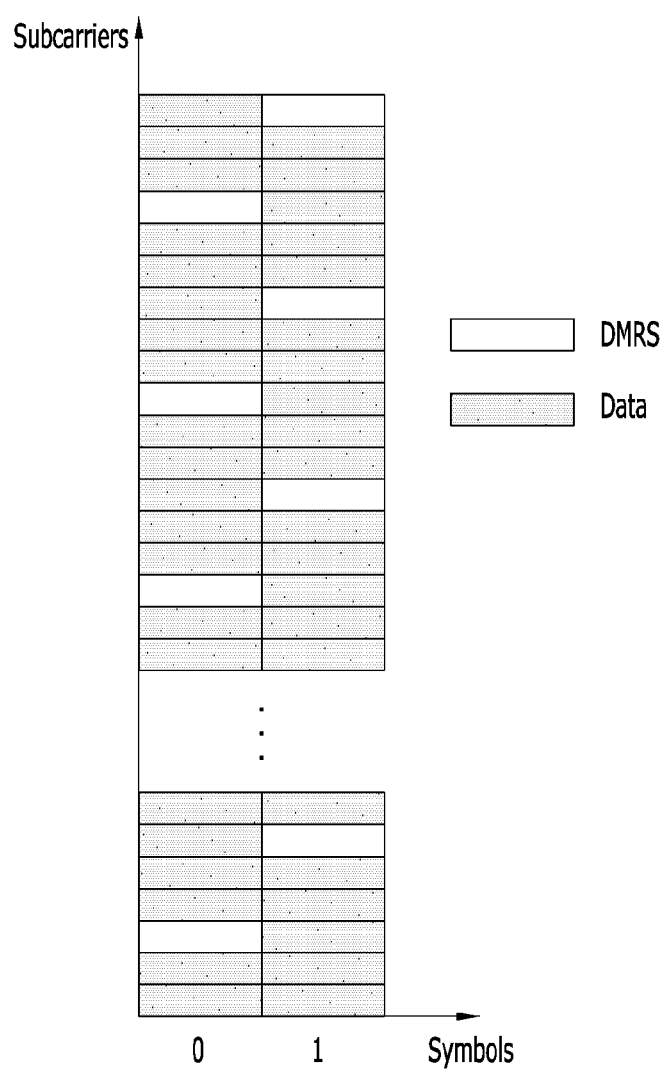

As shown in FIG. 7, DMRSs of DMRS type 5 may be allocated at fixed subcarrier spacing in the first and second symbols (0) and (1), but the positions of subcarriers for which the DMRSs in the first symbol (0) are allocated are different from those for which the DMRSs in the second symbol (1) are allocated.

The positions of subcarriers with DMRSs and the subcarrier spacing at which the DMRSs are allocated, illustrated in FIG. 3 through FIG. 7, may be changed.

The longer the subcarrier spacing for DMRSs, the lower the performance in a channel with a long delay spread and the less the DMRS overhead. In a case where DMRSs are allocated only in the first symbol, the higher the moving speed of the terminal, the more likely the performance will deteriorate and the shorter the demodulation time for channel estimation.

The overhead ratio and symbol hopping availability depending on the DMRS type illustrated in FIG. 3 through FIG. 7 are as shown in Table 1.

TABLE 1

| DMRS type | type 1 | type 2 | type 3 | type 4 | type 5 |
|---|---|---|---|---|---|
| Overhead ratio (%) | 33.3 | 16.7 | 16.7 | 8.3 | 16.7 |
| Symbol hopping availability | Available | Available | Not available | Not available | Available |

Accordingly, DMRSs may be allocated as shown in FIG. 3 through 7, taking into account the demodulation delay time, the delay spread of the channel, and the moving speed of the terminal.

Figure 8:
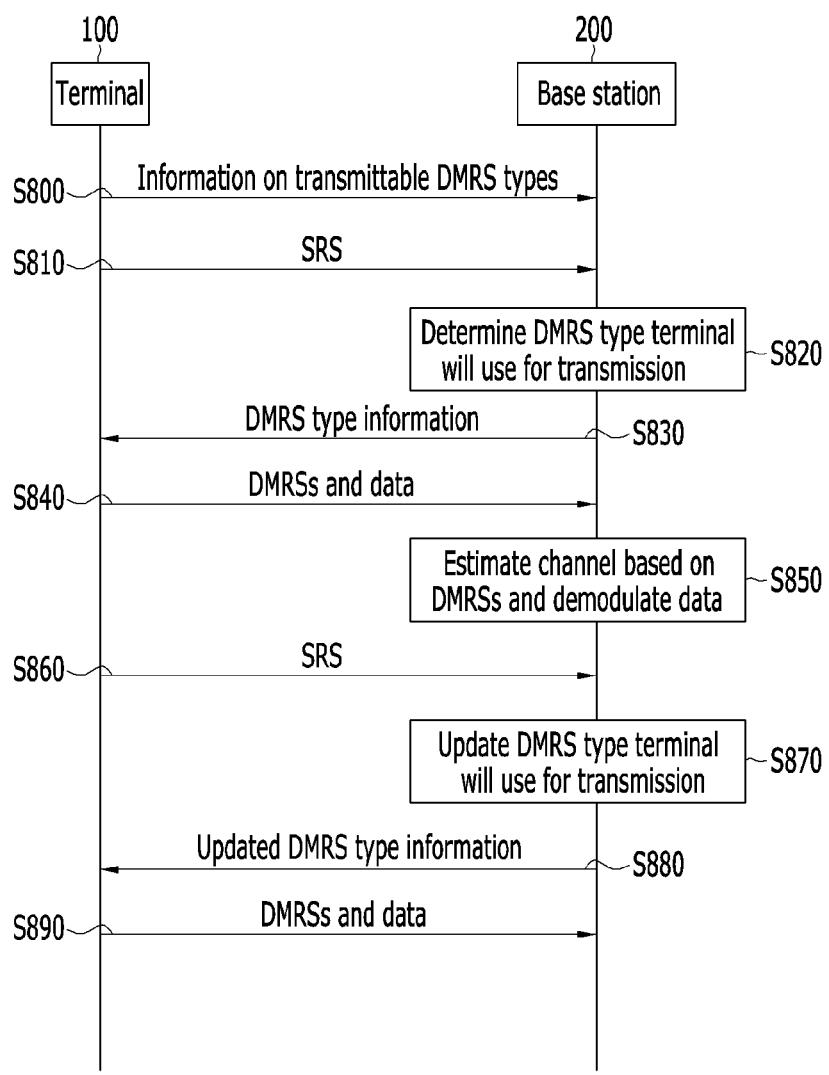
FIG. 8 is a view showing a method for transmitting and receiving data between a base station and a terminal according to an exemplary embodiment of the present invention.

FIG. 8 is a view showing a method for transmitting and receiving data between a base station and a terminal according to an exemplary embodiment of the present invention.

Referring to FIG. 8, a terminal 100 supports various types of DMRS as shown in FIG. 3 through FIG. 7, and sends information on the DMRS types transmittable by itself to a base station 200 (S800). The DMRS types transmittable by the terminal 100 may be determined based on the implementation structure of the terminal 100. The transmittable DMRS type information may be sent to the base station 200 using information, like UE capability information, exchanged between the terminal 100 and the base station 200.

The terminal 100 sends SRSs so that the base station 200 measures channel information between the terminal 100 and itself (S810). The SRSs may be transmitted periodically or non-periodically.

The base station 200 determines the DMRS type the terminal 100 will use for transmission, among the DMRS types transmittable by the terminal 100, by taking into account the channel environment between the terminal 100 and the base station 200, the demodulation delay time, the moving speed of the terminal 100, the DMRS types transmittable by the terminal 100, and the DMRS types that can be demodulated by the base station 200 (S820), and sends information on the determined DMRS type to the terminal 100 through a PDCCH or PDSCH (S830).

The terminal 100 allocates DMRSs and data to the resource elements of a PUSCH based on the DMRS type information received from the base station 200, and sends the DMRSs and data to the base station 200 through the PUSCH (S840).

The base station 200 performs channel estimation based on the received DMRSs, and demodulates the data using the channel estimation value (S850). The terminal 100 sends an SRS (S860), and the base station 200 measures and updates channel information between the base station 200 and the terminal 100 based on the SRS.

The base station 200 updates the DMRS type the terminal 100 will use for transmission, using the updated channel information between the base station 200 and the terminal 100 (S870), and sends the updated DMRS type information to the terminal 100 through a PDCCH or PDSCH (S880).

The terminal 100 allocates DMRSs and data to the resource elements of a PUSCH based on the updated DMRS type information received from the base station 200, and sends the DMRSs and data to the base station 200 through the PUSCH (S890).

The base station 200 performs channel estimation based on the received DMRSs, and demodulates the data using the channel estimation value.

Figure 9:
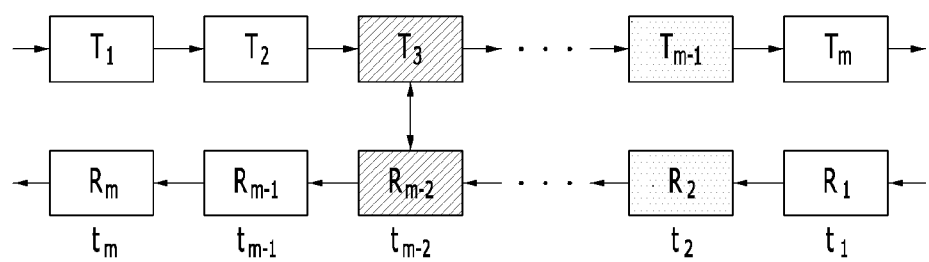
FIG. 9 is a view showing an example of a data transmitting apparatus and a data receiving apparatus which are configured in blocks, according to an exemplary embodiment of the present invention.

FIG. 9 is a view showing an example of a data transmitting apparatus and a data receiving apparatus which are configured in blocks, according to an exemplary embodiment of the present invention.

In FIG. 9, $T_1$-$T_m$ are transmitting blocks required for the transmitting apparatus, and $R_1$-$R_m$ are receiving blocks required for the receiving apparatus. The time required for demodulation in each receiving block of the receiving apparatus is $t_1, t_2, \ldots, t_m$, and the total time required for demodulation is $t_1+t_2+ \ldots +t_m$. The times vary greatly depending on the implementation structure. The less strict the constraints on the delay time required for demodulation, the more diverse the base station configuration.

In general, a reception function corresponding to a transmission function is required, in order for a transmitted signal to be demodulated. For example, a signal transmitted after it has been fed through interleaving in the transmitting apparatus needs to be deinterleaved in the receiving apparatus, and a signal transmitted after it has been fed through IFFT (Inverse Fast Fourier Transform) needs to be fed through FFT (Fast Fourier Transform) in the receiving apparatus.

At least one of the functions of the $T_1$-$T_m$ blocks required for the transmitting apparatus may be omitted depending on the required demodulation delay or channel status, the moving speed of the terminal, and so on. For example, suppose that the functions of the $R_{m-2}$ block and the corresponding $T_3$ block in FIG. 9 are to improve PARR. If the time required for demodulation is too long for a base station connected to the terminal to receive low-delay service, the functions of the $R_{m-2}$ block and the corresponding $T_3$ block may be turned off. When the functions of the $R_{m-2}$ block and the corresponding $T_3$ block are turned off, the demodulation delay may be reduced by $t_{m-2}$. Also, suppose that the functions of the $R_2$ block and the corresponding $T_{m-1}$ block are to improve performance for a terminal with high moving speed. In the case of an indoor base station where moving speed is not high, the functions of the $T_{m-1}$ block and the corresponding $R_2$ block are not much needed. Accordingly, the functions of the $T_{m-1}$ block and the corresponding $R_2$ block may be turned off, and therefore the demodulation delay may be reduced by $t_2$. Besides, the power consumption of the terminal is reduced. For other various purposes than the aforementioned purposes, the functions of the blocks corresponding to the transmitting and receiving apparatuses may be turned off. When the functions of the $T_3$ block and the corresponding $R_{m-2}$ block and the functions of the $T_{m-1}$ block and the corresponding $R_2$ block are turned off, the total time required for demodulation is D–$t_2$–$t_2$, and the demodulation delay is reduced by ($t_2+t_{m-2}$), compared to when the functions of the $R_1$ to $R_m$ blocks are all performed.

Figure 10:
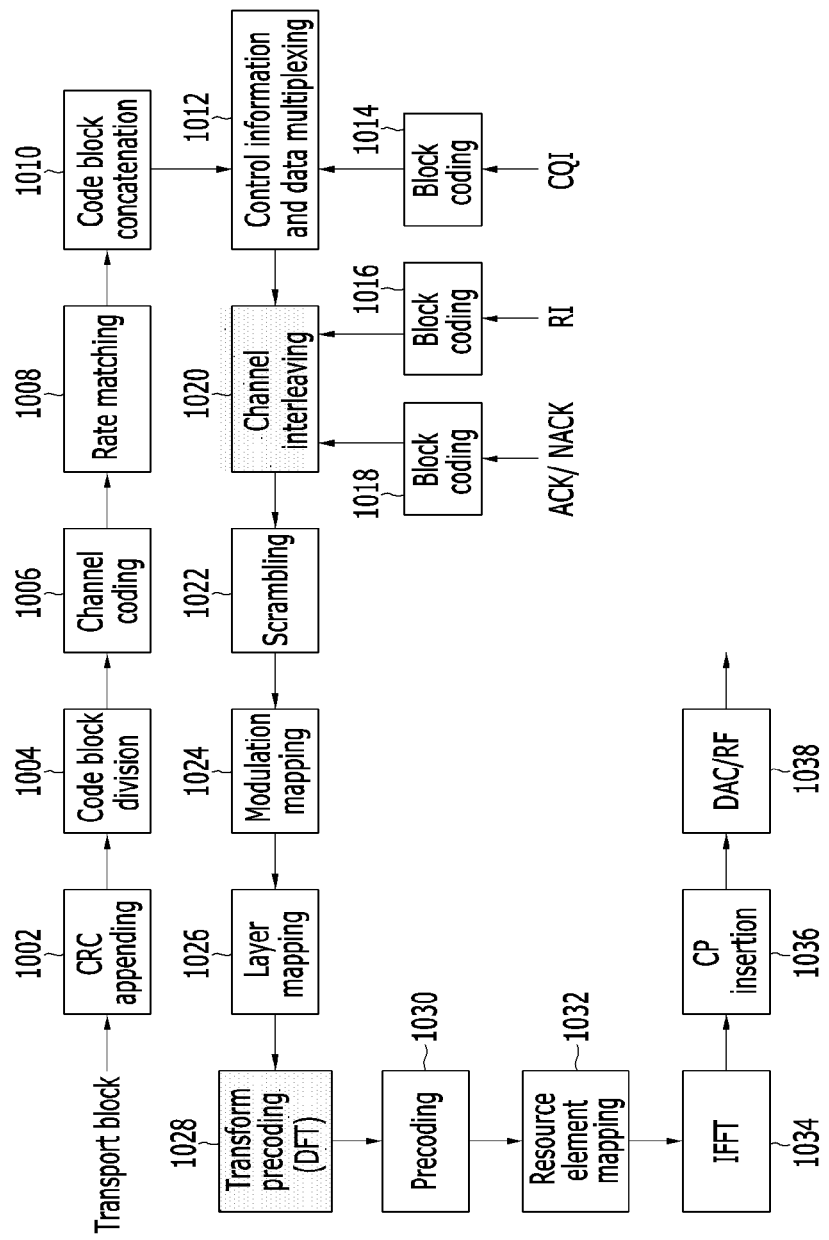
FIG. 10 is a view schematically showing a data transmitting apparatus in an LTE system.

FIG. 10 is a view schematically showing a data transmitting apparatus in an LTE system.

Referring to FIG. 10, the data transmitting apparatus may have blocks 1002 to 1038 that perform functions like CRC adding, code block division, channel coding, rate matching, code block concatenation, control information and data multiplexing, channel interleaving, block coding, scrambling, modulation mapping, layer mapping, transform precoding such as DFT, precoding, resource element mapping, IFFT, CP insertion, and DAC/RF.

A CRC is added to a transport block, which is data to be sent by the block 1002. With the CRC added to the transport block, error detection on the transport block may be supported. The transport block with the CRC added to it is segmented into a plurality of code blocks at the block 1004, and a CRC is added to each code block. The block 1006 performs channel coding on the code blocks with the CRCs added to them, the block 1008 performs rate matching on each code block that has undergone channel coding, and the block 1010 concatenates each code block that has undergone rate matching. If required, control information may be block-coded. The control information may include channel quality information including CQI and/or PMI, HARQ-ACK, RI (Rank indication), etc. The block 1014 block-codes CQI information, and the block 1012 multiplexes the block-coded control information and data. Then, the block 1020 performs channel interleaving on the multiplexed control information and data. If required, the block 1020 may puncture and multiplex the bits of ACK/NACK and RI information block-coded by the blocks 1018 and 1016.

The channel-interleaved bits are scrambled at the block 1022, and then demodulated and mapped at the block 1024 according to a modulation scheme such as QPSK, 16QAM, 64QAM, etc. A modulated signal is layer-mapped at the block 1026, and transform precoding such as DFT is performed at the block 1028 so that the signal has single-carrier characteristics. Then, precoding is performed at the block 1030 using channel information. The precoded signal is mapped to a resource element consisting of subcarriers and symbols, IFFT is performed at the block 1034, and a CP is added to the signal at the block 1036. Then, the signal is transmitted after DAC/RF conversion at the block 1038.

Here, the channel interleaving block 1020 is required for performance improvement at high moving speed, and the transform precoding block 1028 is required to improve PARR. Accordingly, reductions in demodulation delay and power consumption can be achieved by turning off the functions of the two blocks 1020 and 1028, taking into account the channel environment, low-delay service, lower power consumption for mobiles, etc.

Figure 11:
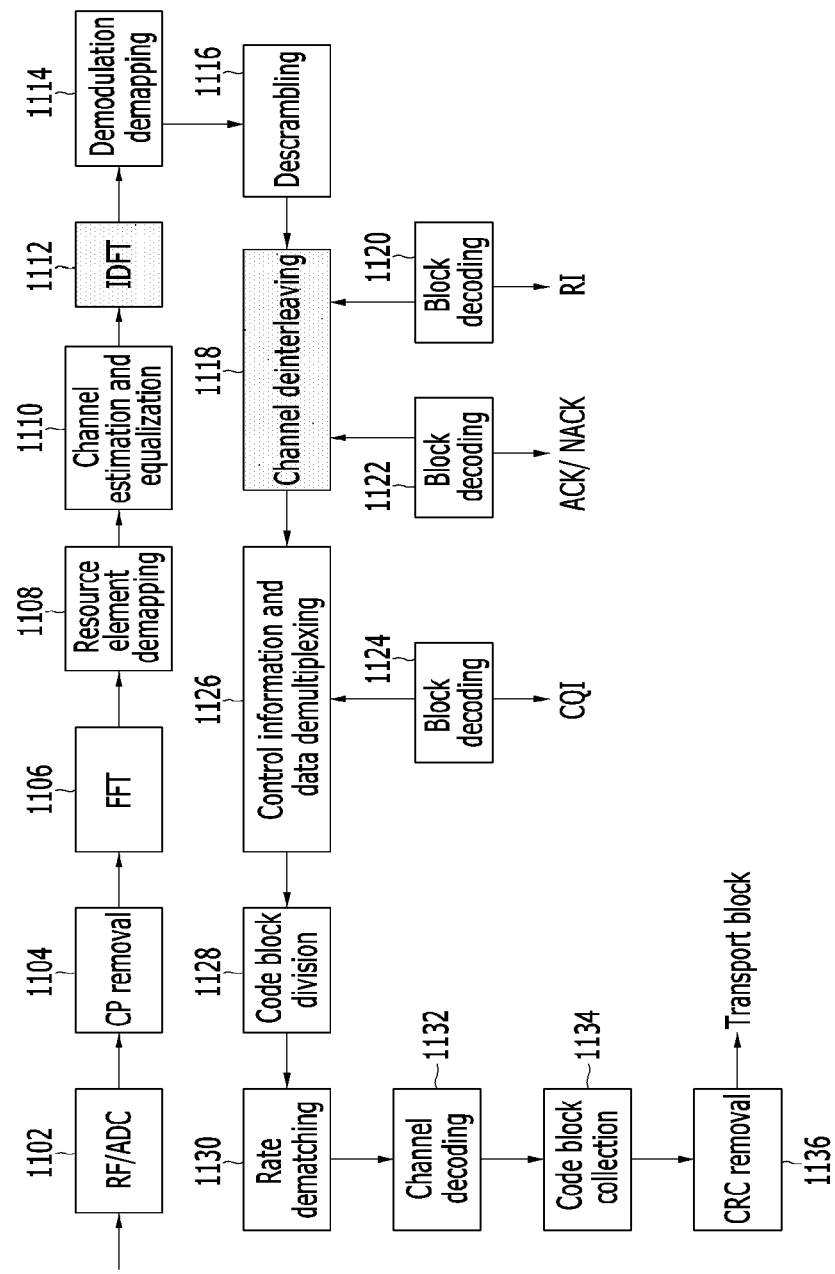
FIG. 11 is a view schematically showing a data receiving apparatus corresponding to the data transmitting apparatus shown in FIG. 10.

FIG. 11 is a view schematically showing a data receiving apparatus corresponding to the data transmitting apparatus shown in FIG. 10.

Referring to FIG. 11, the blocks 1102 to 1136 of the data receiving apparatus perform the functions inverse to the functions performed by the blocks 1002 to 1038 of the data transmitting apparatus, and description of the blocks 1102 to 1136 of the data receiving apparatus will be omitted.

The channel deinterleaving block 1118 of the data receiving apparatus corresponds to the channel interleaving block 1020 of the data transmitting apparatus, and the IDFT block 1112 of the data receiving apparatus corresponds to the transform precoding block 1028 of the data transmitting apparatus. Thus, when the functions of the two blocks 1020 and 1028 in the data transmitting apparatus are turned off, the functions of the two corresponding blocks 1118 and 1112 of the data receiving apparatus also may be turned off.

If the transmitting blocks of the terminal 100 may be pre-configured, the base station 200 may demodulate received signals using the pre-configuration information. If required, the function of at least one transmitting/receiving block may be turned off so that the demodulation delay and the power consumption can be reduced.

Figure 12:
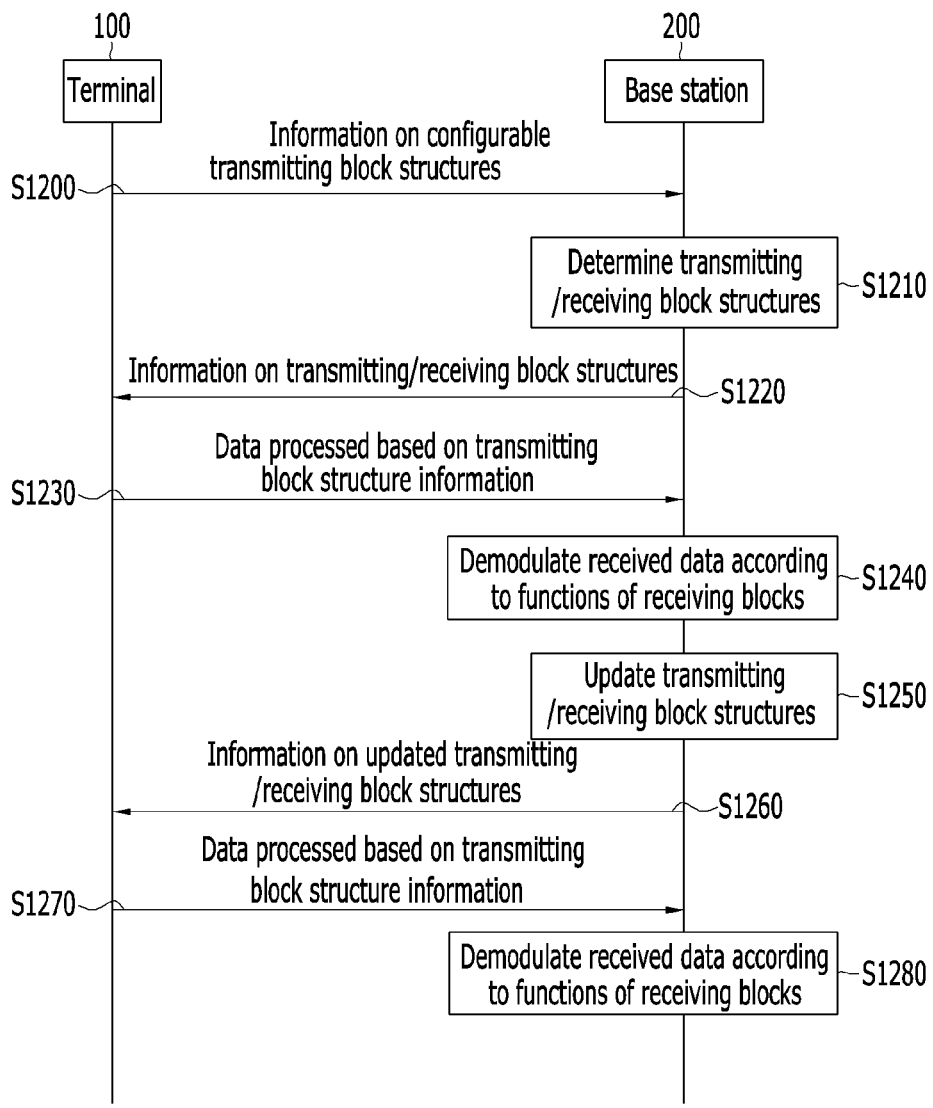
FIG. 12 is a view showing a method for transmitting and receiving data between a terminal and a base station according to another exemplary embodiment of the present invention.

FIG. 12 is a view showing a method for transmitting and receiving data between a terminal and a base station according to another exemplary embodiment of the present invention.

Referring to FIG. 12, the terminal 100 sends configurable transmitting block structure information to the base station 200 (S1200). For example, the configurable transmitting block structure information may include turn-offable block information. Configurable transmitting block structures for the terminal 100 may be determined based on the implementation structure of the terminal 100. The configurable transmitting block structure information may be sent to the base station 200 using information exchanged between the terminal 100 and the base station 200, such as UE capability information.

The base station 200 determines the transmitting/receiving block structures based on the transmitting block structures configurable by the terminal 100, the requirements such as data QoS (quality of service), the channel status between the base station 200 and the terminal 100, the moving speed of the terminal 100, and the receiving block structures configurable by the base station 200 (S1210), and sends information on the determined transmitting/receiving block structures to the terminal 100 through a PDCCH or PDSCH (S1220). The information on the determined transmitting/receiving block structures may include information on the transmitting/receiving blocks whose functions can be turned off.

The terminal 100 configures the transmitting blocks based on the transmitting block structure information received from the base station 200, and processes data according to the functions of the configured transmitting blocks and sends it to the base station 200 (S1230).

The base station 200 configures the receiving blocks according to the determined receiving block structure, and demodulates the received data according to the functions of the configured receiving blocks (S1240).

The base station 200 updates the transmitting/receiving block structures based on a request from the terminal 100 or the requirements such as the QoS for modified data (S1250), and sends information on the updated transmitting/receiving block structures to the terminal 100 through a PDCCH or PDSCH (S1260).

The terminal 100 re-configures the transmitting blocks based on the information on the updated transmitting block structure received from the base station 200, and processes data according to the functions of the re-configured transmitting blocks and sends it to the base station 200 (S1270).

The base station 200 re-configures the receiving blocks based on the information on the updated receiving block structure, and demodulates the received data according to the functions of the re-configured receiving blocks (S1280).

Figure 13:
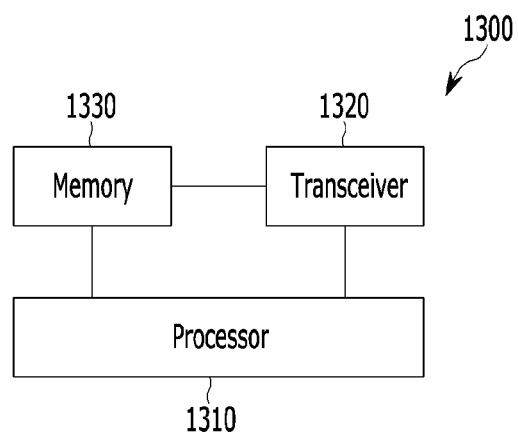
FIG. 13 is a view showing a data transmitting apparatus for a terminal according to an exemplary embodiment of the present invention.

FIG. 13 is a view showing a data transmitting apparatus for a terminal according to an exemplary embodiment of the present invention.

Referring to FIG. 13, a data transmitting apparatus for a terminal 100 includes a processor 1310, a transceiver 1320, and a memory 1330.

The processor 1310 may be implemented to perform the functions of the terminal 100 explained with reference to FIGS. 8 and 9 in a frame structure with short TTIs. The processor 1310 determines the DMRS types transmittable by the terminal 100, among a plurality of DMRS types, based on the positions of DMRSs within a short TTI, transmits this information to the base station 200 through the transceiver 1320, and when the DMRS type the terminal 100 will use is determined by the base station 200, maps DMRSs and data to resource elements based on the DMRS type. Also, the processor 1310 determines the transmitting block structures configurable by the terminal 100 and transmits this information to the base station 200 through the transceiver 1320, and when the transmitting block structure the terminal 100 will use is determined by the base station 200, configures the transmitting blocks according to the transmitting block structure the terminal 100 will use and processes the data.

The transceiver 1320 is connected to the processor 1310 and sends and receives radio signals to and from the base station 200. The transceiver 1320 sends the information on the DMRS types transmittable by the terminal 100 and the information on the transmitting block structures configurable by the terminal 100 to the base station 200 via radio signals, and receives the information on the DMRS type the terminal 100 will use and the transmitting/receiving block structure information from the base station 200 via radio signals.

The memory 1330 may store instructions to be executed by the processor 1310 or load instructions from storage (not shown) and temporarily store them, and the processor 1310 may execute the instructions stored in or loaded from the memory 1330.

The processor 1310 and the memory 1330 are connected together via a bus (not shown), and an input/output interface (not shown) may be connected to the bus. The transceiver 1320 is connected to the input/output interface, and peripheral equipment such as input devices, displays, speakers, storage devices, etc. may be connected to the input/output interface.

Figure 14:
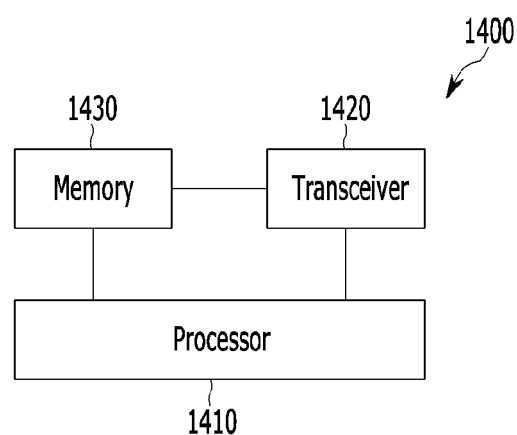
FIG. 14 is a view showing a data receiving apparatus for a base station according to an exemplary embodiment of the present invention.

FIG. 14 is a view showing a data receiving apparatus for a base station according to an exemplary embodiment of the present invention.

Referring to FIG. 14, a data receiving apparatus 1400 for a base station 200 includes a processor 1410, a transceiver 1420, and a memory 1430.

The processor 1410 may be implemented to perform the functions of the base station 200 explained with reference to FIGS. 8 and 9 in a frame structure with short TTIs. The processor 1410 determines the DMRS type the terminal 100 will use for transmission within a short TTI by taking into account the channel status between the terminal 100 and the base station 200, the demodulation delay time, the moving speed of the terminal 100, the DMRS types transmittable by the terminal 100, and the DMRS types that can be demodulated by the base station 200. Also, the processor 1410 determines the transmitting/receiving block structures the terminal 100 and the base station 200 will use respectively, by taking into account at least one among the channel status between the base station 200 and the terminal 100, the data requirements, the moving speed of the terminal 100, the transmitting block structures configurable by the terminal 100, and the receiving block structures configurable by the base station 200.

The transceiver 1420 is connected to the processor 910 and sends and receives radio signals to and from the base station 200. The transceiver 1420 receives the information on the DMRS types transmittable by the terminal 100 and the information on the transmitting block structures configurable by the terminal 100 from the base station 200 via radio signals, and sends the information on the DMRS type the terminal 100 will use and the transmitting/receiving block structure information to the terminal 100 via radio signals.

The memory 1430 may store instructions to be executed by the processor 1410 or load instructions from storage (not shown) and temporarily store them, and the processor 1410 may execute the instructions stored in or loaded from the memory 1430.

The processor 1410 and the memory 1430 are connected together via a bus (not shown), and an input/output interface (not shown) may be connected to the bus. The transceiver 1420 is connected to the input/output interface, and peripheral equipment such as input devices, displays, speakers, storage devices, etc. may be connected to the input/output interface.

The exemplary embodiment of the present invention is not implemented only by a device and/or a method, but can be implemented through a program for realizing functions corresponding to the configuration of the exemplary embodiments of the present invention and a recording medium having the program recorded thereon. Such implementation can be easily made by a skilled person in the art to which the present invention pertains from the above description of the exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the added claims.

What is claimed is:

1. A method for a base station to receive data from a terminal, the method comprising:
   defining a short TTI (transmission time interval) equal to a length of one subslot as a minimum unit of a time resource for data transmission in a subframe including a plurality of subslots;
   determining a reference signal (RS) type the terminal will use for transmission, among a plurality of RS types defined according to the positions of RSs (reference signals) within the short TTI; and
   sending information on the RS type the terminal will use for transmission to the terminal.

2. The method of claim 1, wherein the determining comprises determining the RS type the terminal will use for transmission by taking into account at least one among a channel status between the terminal and the base station, the demodulation delay time, the moving speed of the terminal, the RS types configurable by the terminal, and the RS types that can be demodulated by the base station.

3. The method of claim 2, further comprising:
   receiving sounding RSs (SRSs) from the terminal; and
   estimating the channel status between the base station and the terminal based on the SRSs.

4. The method of claim 2, wherein the determining further comprises receiving information on the RS types transmittable by the terminal from the terminal.

5. The method of claim 1, further comprising:
   determining a transmitting block structure for use in the terminal and a receiving block structure for use in the base station, corresponding to the transmitting block structure; and
   sending information on the transmitting block structure for use in the terminal to the terminal.

6. The method of claim 1, further comprising:
   configuring transmitting blocks according to a transmitting block structure and processing data according to functions of the configured transmitting blocks; and
   mapping RSs and the processed data to resource elements depending on the RS type the terminal will use for transmission and sending the mapped RSs and data.

7. The method of claim 5, wherein the determining of the transmitting block structure and the receiving block structure comprises determining the transmitting block structure and the receiving block structure by taking into account at least one among a channel status between the base station and the terminal, the transmitting block structures configurable by the terminal, the data requirements, a moving speed of the terminal, and the receiving block structures configurable by the base station.

8. The method of claim 5, wherein the transmitting block structure information comprises information on the transmitting blocks having functions that are to be turned off, among the transmitting blocks configurable by the terminal.

9. The method of claim 5, further comprising updating the transmitting block structure for use in the terminal and the receiving block structure for use in the base station, corresponding to the transmitting block structure, based on at least one between a request from the terminal and data requirements.

10. The method of claim 1, further comprising updating the RS type the terminal will use for transmission based on a channel status between the base station and the terminal.

11. The method of claim 1, wherein the RSs comprise DMRSs (Demodulation RSs).

12. A method for a terminal to transmit data, the method comprising:
sending information on a reference signal (RS) type transmittable by the terminal, among a plurality of RS types defined according to the positions of RSs within a short TTI, a minimum unit of a time resource for data transmission in a subframe including a plurality of subslots, which is equal to a length of one subslot;
receiving information on the RS type the terminal will use for transmission from a base station; and
mapping RSs and data to resource elements based on the RS type information.

13. The method of claim 12, further comprising:
sending information on transmitting blocks configurable by the terminal;
receiving information on transmitting blocks the terminal will use from the base station; and
processing the data according to functions of transmitting blocks configured based on the information on transmitting blocks the terminal will use.

14. The method of claim 13, wherein the transmitting blocks the terminal will use are determined by taking into account at least one among a channel status between the base station and the terminal, a transmitting block structures configurable by the terminal, the data requirements, the moving speed of the terminal, and receiving block structures configurable by the base station.

15. The method of claim 12, wherein the RS type the terminal will use for transmission is determined by the base station by taking into account at least one among a channel status between the base station and the terminal, the demodulation delay time, the moving speed of the terminal, the RS types transmittable by the terminal, and the RS types that can be demodulated by the base station.

16. The method of claim 12, wherein the RSs comprise demodulation RSs (DMRSs).

17. An apparatus for a base station to receive data from a terminal, the apparatus comprising:
a processor that defines a short TTI (transmission time interval) equal to a length of one subslot as a minimum unit of a time resource for data transmission in a subframe including a plurality of subslots, determines a demodulation reference signal (DMRS) type the terminal will use for transmission, among a plurality of DMRS types defined according to the positions of DMRSs within the short TTI, and determines a transmitting block structure the terminal will use; and
a transceiver that sends information on the DMRS type the terminal will use for transmission and information on the transmitting block structure the terminal will use to the terminal.

18. The apparatus of claim 17, wherein the processor determines the DMRS type the terminal will use for transmission by taking into account at least one among a channel status between the base station and the terminal, the demodulation delay time, the moving speed of the terminal, the DMRS types transmittable by the terminal, and the DMRS types that can be demodulated by the base station.

19. The apparatus of claim 17, wherein the processor determines the transmitting block structure the terminal will use by taking into account at least one among a channel status between the base station and the terminal, the transmitting block structures configurable by the terminal, the data requirements, a moving speed of the terminal, and receiving block structures configurable by a base station.

20. The apparatus of claim 17, wherein the information on the transmitting block structure comprises information on the transmitting blocks having functions that are to be turned off, among the transmitting blocks configurable by the terminal.

* * * * *